United States Patent

Akami

[11] 4,025,199
[45] May 24, 1977

[54] OPTICAL COLOR MIXING METHOD

[75] Inventor: Hitoshi Akami, Yokohama, Japan

[73] Assignee: Agency of Industrial Science & Technology, Tokyo, Japan

[22] Filed: Mar. 20, 1975

[21] Appl. No.: 560,188

[30] Foreign Application Priority Data

Apr. 8, 1974  Japan .............................. 49-39708

[52] U.S. Cl. ........................... 356/190; 350/161 W; 356/179
[51] Int. Cl.² ........................................... G01T 3/10
[58] Field of Search ........... 350/174; 356/190, 174, 356/179

[56] References Cited
UNITED STATES PATENTS

| | | | |
|---|---|---|---|
| 1,619,468 | 3/1927 | Gruender | 350/174 |
| 3,336,835 | 8/1967 | Evensen et al. | 350/174 |
| 3,708,797 | 1/1973 | Solomon et al. | 350/174 |

Primary Examiner—Vincent P. McGraw
Attorney, Agent, or Firm—Haight & Huard

[57] ABSTRACT

A novel method of preparing a recipe for the reproduction of a particular color on a coloring material from a number of coloring agents or dyes, which comprises passing white light rays through a number of optical filtering means, controlling filtration characteristics of the filtering means to correspond to spectral distribution characteristics of the dyes, projecting on the coloring material the light rays which have passed through the filtering means to produce a monitoring color thereon, and modulating wavelength and amplitude outputs of the filtering means until the monitoring color simulates the particular color. The method precludes the complicated task of evaluating color affecting factors such as surface texture of the coloring material and eliminates the need for repeated coloring tests.

8 Claims, 1 Drawing Figure

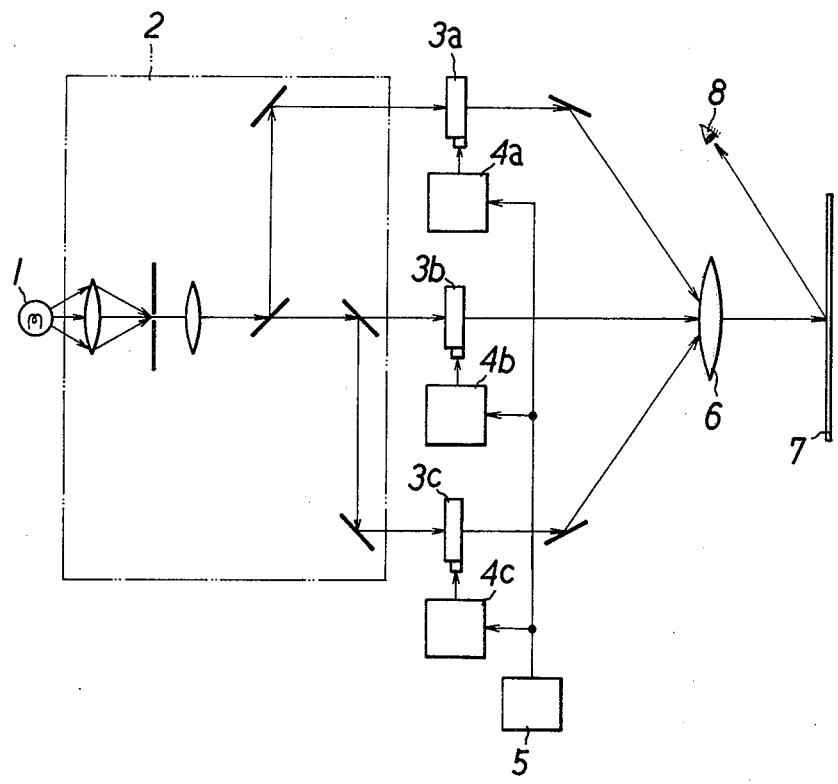

OPTICAL COLOR MIXING METHOD

BACKGROUND OF THE INVENTION

1. Field of the Invention

This invention relates to a method of mixing colors using optical modulators, for the purpose of determining a recipe for duplicating on a color receiving material a specified color in dyeing, printing or coloring processes on cloth, textile, plastics, resins or paper.

2. Description of Prior Art

Heretofore, a color mixing in the dyeing process, for instance, has been carried out by first analyzing the spectral distribution characteristics of a specified color sample using a spectrophotometer. On the basis of the results of the analysis, the mixing ratio of the respective dyes in the recipe is then determined, taking into consideration predetermined data concerning the particular characteristics of the dyes and the dyeing material to be used.

A method of the type just described is disadvantageous from an economic point of view in the operation incorporating the characteristics of the dyeing material as parameters requires the assistance of a relatively large computer. Furthermore, the recipe so obtained is invariably of a primitive nature and must be tested repeatedly before a final satisfactory recipe is obtained. These operations are time-consuming as in a more conventional method which solely depends on senses and experiences of a skilled colorist. For these reasons, there have been few attempts to mechanize the color mixing operation.

Moreover, light scattering characteristics of a dye or a color-receiving material surface are known to significantly influence the color of the material as perceived by human eyes. As any modification of color recipe to complement such characteristics of a color receiving material is extremely difficult, color mixing recipes prepared by prior-art methods usually turn out to be incapable of exactly duplicating specified colors.

SUMMARY OF THE INVENTION

It is an object of the invention to provide a novel color mixing method which overcomes the afore-mentioned shortcomings of the prior-art methods.

It is another object of the invention to provide a color mixing method which can be advantageously employed in a dye mixing process.

It is still another object of the invention to provide a color mixing method of the nature mentioned above, which can precisely duplicate a specified color by simple operations without the assistance of a skilled colorist or a large computer.

It is a further object of the invention to provide a color mixing method of the nature mentioned above, which can determine a precise recipe for a specified color optically in a facilitated and economic manner and without repeated coloring tests.

It is a still further object of the invention to provide a color mixing method of the nature mentioned above, which utilizes a number of acousto-optic filters as optical modulators.

For the purpose of preparing a recipe for the reproduction of a particular color on a coloring material from a number of coloring agents or dyes, a mmethod of the invention comprises passing white light rays through a number of optical filtering means, controlling filtration characteristics of the filtering means to correspond to the respective spectral distribution characteristics of the dyes, projecting on the coloring material the light rays which have passed through the filtering means to produce a monitoring color thereon, and modulating outputs of the filtering means until the monitoring color simulates the particular color. In a practical form of the invention, a number of acousto-optical filters are employed as the filtering means in combination with a corresponding number of ultrasonic driving units which are controlled by an electrical unit to produce control signals of wavelengths and amplitudes corresponding to the spectral distribution characteristics of the respective dyes. The specified particular color can be reproduced simply by mixing the dyes in accordance with the output readings of the corresponding filters.

The above and other objects, features and advantages of the invention will become clear from the following particular description of the invention and the appended claims, taken in conjunction with the accompanying drawing which shows by way of example a preferred embodiment of the present invention.

BRIEF DESCRIPTION OF THE DRAWING

In the accompanying drawing:

The sole FIGURE is a block diagram illustrating by way of example an optical system which is suitable for putting into practice the method according to the invention.

PARTICULAR DESCRIPTION OF THE INVENTION

Referring to the accompanying drawing which diagrammatically shows by way of example an embodiment of the invention, light from a light source 1 is split by an optical system 2 into a plurality of parallel rays, which rays are respectively passed through acousto-optical filters 3a, 3b and 3c, e.g. of the type described by T. YANO et al. in Applied Physics Letters 24(6):256–258 (Mar. 15, 1974) and in the Proceedings of the 6th Conference on Solid State Devices held in Tokyo in 1974 and published as a supplement to the Journal of the Japan Society of Applied Physics, line 44, pp. 127–131 (1975).

The acousto-optical filters 3a, 3b and 3c are connected to ultransonic driving units 4a, 4b and 4c, respectively, which in turn are connected to a control unit 5, e.g. a Digital Equipment PDP 8/E computer. The ultrasonic driving units, in response to signals from the control unit, output ultrasonic wave signals each with a wavelength $\lambda$ and an amplitude A which correspond to component color spectra of a desired color to the acousto-optical filters.

The acousto-optical filters 3a, 3b and 3c control the wavelength of light rays passing therethrough in response to the wavelength $\lambda$ of ultrasonic wave signals from the ultrasonic driving units 4a, 4b and 4c. Likewise, the acousto-optical filters control the intensity of light rays passing therethrough in response to amplitude A or ultrasonic wave signals from the ultrasonic oscillator driving units.

The filtered light rays are then collected projected through an optical system 6 on the surface of a color receiving material 7. In the FIGURE, the reference numeral 8 shows an observer's eye.

The method of the invention is now described more particularly with reference to a case wherein three different dyes $D_1$, $D_2$ and $D_3$ are to be mixed to dye a material in a specified color.

The concentrations of the three dyes $D_1$, $D_2$ and $D_3$ which have spectral energy distributions required to theoretically produce the specified color can be determined by solving simultaneous equations using dyeing characteristics data of the respective dyes supplied by the manufacturers.

The method and apparatus for calculating dye densities are known in the art, e.g. using the Zeiss Automatic Colorimeter RFC 3.

In response to signals from the control unit 5, the ultrasonic driving units 4a, 4b and 4c dispatch to acousto-optical filters 3a, 3b and 3c ultrasonic waves with wavelengths λ and amplitudes A which correspond respectively to the color spectra of the dyes $D_1$, $D_2$ and $D_3$ of the particular concentrations just determined. The acousto-optical filters accordingly modulate the wavelength and intensity of light rays passing therethrough in response to the wavelengths λ and amplitudes A.

The light rays which have their wavelengths and intensity modulated by the acousto-optical filters 3a, 3b and 3c are now projected by the optical system on the surface of a color receiving material 7 to simulate the dyed conditions. The observer 8 compares the light reflected from the material 7 with the specified color sample. The observer can freely adjust ultrasonic driving units 4a, 4b and 4c through the control unit 5 until the color projected on the material sample 7 satisfactorily duplicates the specified color.

Having an operating frequency range of several tens of megahertz, the acousto-optical filters can freely allow passage of light rays of specific color spectra as dictated by the control unit 5, within the range of eye perception of the observer 8 and in a facilitated and repeated manner.

By incorporating a spectrophotometric monitoring unit in place of the observer 8, it is furthermore possible to have the control unit 5 automatically compare the surface color of the material 7, as monitored by the spectrophotometric unit, with color spectra of the specified color sample, making modifications in the outputs thereof until a satisfactory color duplication is achieved.

It would be clear from the foregoing description that the color mixing method according to the invention precludes the complicated operations necessary to evaluate various color affecting factors including characteristics of a color receiving material in determining a color recipe, as it requires the asistance of only a very small computer in the process. Futhermore, the method of the invention can eliminate the coloring tests which have thus far been invariably required in prior-art methods, significantly shortening the time required for the determination of a satisfactory color recipe and achieving great savings in time and money.

Though the invention has been described in connection with a preferred embodiment, persons having ordinary skill in the art will be able to make various modifications and adaptations in the specifically described embodiment and therefore it should be understood that the invention is limited only by the spirit and scope of the appended claims.

What is claimed is:

1. A method of preparing a recipe for the reproduction of a particular color on a coloring material from a number of coloring agents or dyes, said method comprising the steps of:

passing white light rays through a plurality of optical filtering means;

controlling filtration characteristics of said filtering means to correspond to predetermined spectral distribution characteristics of said coloring agents or dyes;

projecting the light rays which have passed through said filtering means onto said coloring material to produce a monitoring color thereon; and modulating wavelength and amplitude outputs of said filtering means until said monitoring color simulates said particular color.

2. A method as defined in claim 1, further comprising the step of mixing said dyes in accordance with output readings of said filtering means.

3. A method as defined in claim 1, wherein said filtering means are acousto-optical filters and are controlled by an electrical unit through ultrasonic driving units which are adapted to produce signals of wavelengths and amplitudes corresponding respectively to said spectral distribution characteristics of said dyes.

4. A method as defined in claim 3, wherein reflections of the light rays projected on said coloring material are monitored by a spectrophotometer.

5. A method as defined in claim 1, wherein said white light rays are passed separately through said filtering means and the resultant filtered light rays are collected prior to projection onto said coloring material.

6. A method as defined in claim 5, further comprising the step of mixing said dyes in accordance with output readings of said filtering means.

7. A method as defined in claim 5, wherein said filtering means are acousto-optical filters and are controlled by an electrical unit through ultrasonic driving units which are adapted to produce signals of wavelengths and amplitudes corresponding respectively to said spectral distribution characteristics of said dyes.

8. A method as defined in claim 7, wherein reflections of the light rays projected on said coloring material are monitored by a spectrophotometer.

* * * * *